United States Patent [19]

Suzuki et al.

[11] Patent Number: 5,118,520
[45] Date of Patent: Jun. 2, 1992

[54] FOAMABLE AQUEOUS SEASONING COMPOSITION COMPRISING ETHANOL AND METHOD OF MAKING

[75] Inventors: Teiichi Suzuki, Noda; Shosuke Shigeta, Matsudo; Tomoyuki Oguri, Nagareyama, all of Japan

[73] Assignee: Kikkoman Corporation, Noda, Japan

[21] Appl. No.: 499,998

[22] Filed: Mar. 27, 1990

[30] Foreign Application Priority Data

Mar. 31, 1989 [JP] Japan .................................. 1-078289
Jun. 15, 1989 [JP] Japan .................................. 1-150630

[51] Int. Cl.⁵ .............................................. A23L 1/00
[52] U.S. Cl. ...................................... 426/564; 426/116; 426/638; 426/650
[58] Field of Search ............... 426/116, 564, 613, 638, 426/650

[56] References Cited

U.S. PATENT DOCUMENTS

| | | | |
|---|---|---|---|
| 4,420,495 | 12/1983 | Hammer et al. | 426/564 |
| 4,525,372 | 6/1985 | Giddey et al. | 426/564 |
| 4,587,130 | 5/1986 | Stauber | 426/564 |
| 4,659,581 | 4/1987 | Satani et al. | 426/537 |
| 4,882,182 | 11/1989 | Halls et al. | 426/116 |
| 4,919,964 | 4/1990 | Adams et al. | 426/604 |

FOREIGN PATENT DOCUMENTS

| | | |
|---|---|---|
| 56-137855 | 10/1981 | Japan . |
| 56-140558 | 3/1983 | Japan . |
| 62-316699 | 1/1989 | Japan . |
| 62-265696 | 4/1989 | Japan . |
| 63-303244 | 6/1990 | Japan . |
| 1314761 | 4/1973 | United Kingdom . |

OTHER PUBLICATIONS

Food Engineering, May 1966, pp. 112–114.

*Primary Examiner*—Donald E. Czaja
*Assistant Examiner*—Jean L. Aberle
*Attorney, Agent, or Firm*—Banner, Birch, McKie & Beckett

[57] ABSTRACT

The present invention relates to a foamable seasoning comprising a nonfat aqueous seasoning, 3–10% ethanol and an emulsifier, and a method of making and foaming the seasoning.

12 Claims, 9 Drawing Sheets

F I G. 1
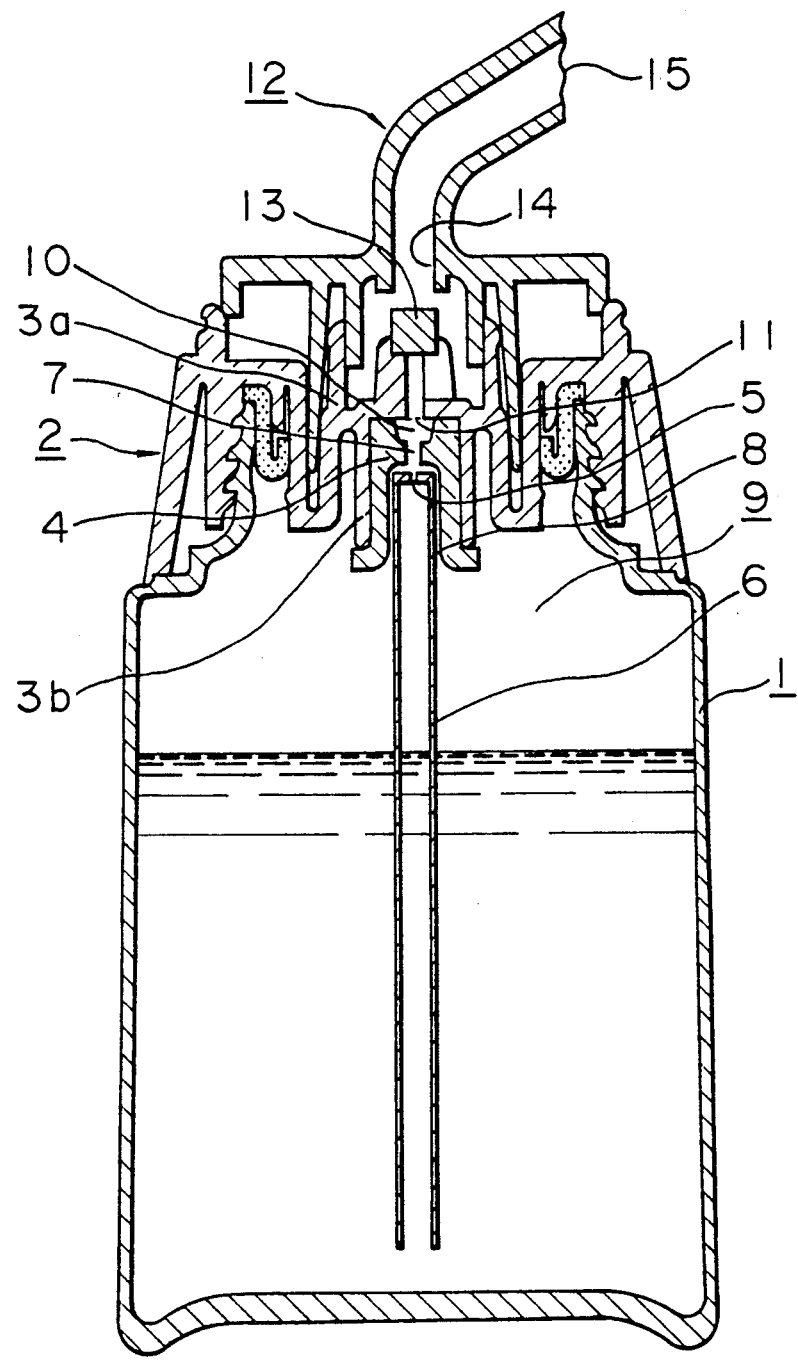

FOAMABLE AQUEOUS SEASONING COMPOSITION COMPRISING ETHANOL AND METHOD OF MAKING

BACKGROUND OF THE INVENTION

The present invention relates to a foamed seasoning and a foamable seasoning composition liquor for producing the foamed seasoning.

Aqueous seasonings such as soy sauce, non-oil dressings, Worcestershire sauce, soup for noodles or the like are liquid and thus have high fluidity. When they are used as a dressing, it is difficult to make them adhere to be retained on a desired dish or food materials sufficiently and thus they must be used in large amounts. Further, the seasoning flows down to the bottom of a container or serving dish and is absorbed excessively in the lower part of the aforementioned desired dish or food materials thus giving an excessive amount of seasoning to them as well as softening their texture and deteriorating the texture. At the same time, if there is are an adjacent dishes or food materials, the seasoning adheres to and penetrate into them thus deteriorating their taste as well.

Furthermore, when seasoning liquor is brought into contact with food materials in a noodle form on a heated pan such as in the case of fried noodles (chow mein), the noodles have the problem of absorbing an excessive amount of seasoning in the vicinity of the bottom of the container, so that the materials of the noodles is not only softened and weakened but also scorched easily.

The present inventors have conducted extensive research in order to obtain a seasoning having such problems eliminated. As a result, they have found the aforementioned object can be achieved by a foamed seasoning which is obtained by adding an emulsifier to an aqueous seasoning and forcing the mixture to be blended with gas and to be foamed. Thus, the present invention has been accomplished on the basis of this knowledge.

SUMMARY OF THE INVENTION

The present invention is related to a foamable seasoning comprising a nonfat aqueous seasoning, 3-10% ethanol, and an emulsifier, and a method of making and foaming said seasoning.

The present invention is explained in detail below.

First of all, as the aqueous seasonings used for the present invention, there are mentioned aqueous seasonings which contain no or little fats and oils, for example soups such as soup for noodles, soup for Tempura, soup for Sukiyaki and the like; sauces such as sauce for steak, Worcestershire sauce and the like; liquid stocks such as a liquid stock made from bonito, a liquid stock made from dried small sardines and the like; soup for Chinese noodles, bouillon soup and the like; PONZU-SHOYU (vinegar and citrus juice blended soy sauce); sweet sake "MIRIN" type seasonings, seasoning extracts, non-oil dressings, and the like. They also include naturally fermented soy sauces such as common soy sauce, light color soy sauce, extra light color soy sauce, "TAMARI" soy sauce which is made from refined soy, re-fermented soy sauce and the like, and rapidly fermented soy sauce; soy sauces having reduced saline content or low level of saline content which are obtained by desalination of the naturally fermented soy sauces; semi-fermented soy sauces of amino acid liquor blended soy sauces in which an amino acid liquor obtained by chemically or enzymtically decomposing protein materials or those having starch materials added thereto and which have been blended: KOJI-digested liquors or soy sauce like seasonings obtained by yeast fermentation and/or lactic acid fermentation of the KOJI-digested liquor and the like.

Next, as the emulsifiers used for the present invention, there are preferably mentioned emulsifiers having hydrophilic nature and foamability such as fatty acid esters of sucrose, fatty acid esters of glycerin and the like. Among them, particularly those having a HLB (Hydrophilic Lipophilic Balance) value of 13 or more are preferred because of high foamability (volume ratio of a gas phase per volume of foam) and foam stability (maintenance of foam).

The emulsifier is preferably added in an amount of 0.03% by weight (referred to hereinafter merely as %) or more, particularly in an amount of 0.1-0.5% to the total weight of the liquor which is obtained by adding to and dissolving in an aqueous seasoning an emulsifier and, if necessary, a thickening agent and other additives.

In this place, the foamability and foam stability of the liquor extensively increases by combining ethyl alcohol together with the emulsifier. The amount of ethyl alcohol added is preferably in the range of 3-10%, particularly 3-7% to the total amount of the liquor.

When the emulsifier is added to the aqueous seasoning, it is preferably added at a temperature of the melting point or more of the emulsifier, for example at a temperature in the seasoning of 50°-60° C., since the emulsifier can be dispersed and dissolved homogeneously and rapidly.

Thus, a foamable seasoning composition liquor having a high foamability and a high foam stability after having been foamed is obtained.

Next, the foamed seasoning of the present invention is obtained by admixing the foamable seasoning composition liquor obtained above with gas thus foaming the liquor.

That is to say, the foamable seasoning composition liquor is forcibly admixed with air and to foam the liquor by means of a homogenizer, an apparatus for producing whipped cream or the like.

Also, the tube portion of a long foam exhaust nozzle is divided by a partition wall into at least two interstitial passages. The foamable seasoning composition liquor is injected from one of divided passages and at the same time gas (e.g. air) is injected from the other passage in order to admix vigorously the two fluids within the nozzle and to obtain the foamed seasoning.

A longer hollow tube may be inserted into the long foam exhaust nozzle to divide into an interstitial passage of the hollow tube and an interstitial passage constructed by the exterior wall of the hollow tube and the interior wall of the nozzle to conduct the admixing in the same manner as described above.

Furthermore, a well-known foamed liquid generating and squeezable container as shown in Japanese Patent Publication No. 20262/85 and FIG. 1 may be used.

BRIEF DESCRIPTION OF THE DRAWINGS

FIG. 1 illustrates a structure of a well-known foamed liquid generating, and squeezable container which can be used in the present invention.

DETAILED DESCRIPTION OF THE INVENTION

Figure 2A:
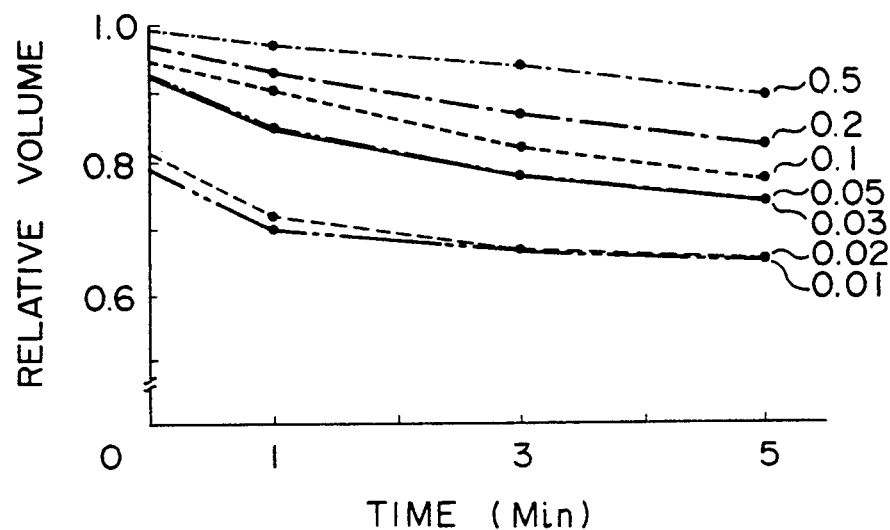
FIG. 2A shows relative volume with time of foamed soups for noodle without any emulsifier.

FIG. 1 illustrates a structure of a well-known foamed liquid generating and squeezable container which can be used in the present invention. The intermediate cap 2 which is screwed to the container body 1 is provided at the central part with cylindrical inner cylinders 3a and 3b extending upwardly and downwardly, respectively, and a cylindrical pipe joint 4, in the inside of which an exit pipe 6 having an interstitial passage 5 is inserted.

At the upper end of the pipe joint 4, a joint pore 7 is pierced and three air flowing grooves (intersticial passages) 8 are provided on the inner part of the pipe joint 4, so that the vapor phase 9 in the container body is communicated with the joint pore 7 through the grooves. An admixture chamber 10 is provided on the top of the joint pore 7 and covered with a net 11 having a mesh structure.

When the exterior cap 12 which is covered over the top of the inner cylinder 3a extending upwardly is pulled out upwardly, the stopper 13 of the inner cap 2 opens the injection pore 14 on the top of the inner cylinder 3a. In this connection, 15 denotes an exhaust nozzle.

An embodiment of injecting a foamable seasoning composition liquor as a foamed seasoning with use of a foamed liquid generating and squeezing container as shown in FIG. 1 is explained below.

That is to say, when the container body is deformed by pressing it with fingers, the vapor phase (air in the head space) flows out from the container through the passage comprising the air flowing grooves 8, the joint pore 7, the admixture chamber 10, the net 11 and the injection pore 14. However, the passage is narrow and only a certain amount of air (which will be utilized afterwards for forcibly admixing it with a foamable seasoning composition liquor) flow out, so that the pressure of the vapor phase 9 within the container body 1 increases temporarily. In consequence, the foamable seasoning composition liquor in the container is injected into the joint pore 7 through the long interstitial passage 5 of exit pipe 6 and is forcibly admixed with a certain amount of the air which is injected through the air flowing grooves in the admixture chamber 10, passed though the net 11 having a mesh structure to give a fine, dense foamed seasoning, which is injected from the distal end of the exhaust nozzle 15.

Next, when the deformation of the container body 1 by pressing with fingers is discontinued, air enters into the container body 1 through the passage comprising the exhaust nozzle 15, the injection pore 14, the net 11, the admixture chamber 10, the joint pore 7 and the exit pipe 6, and the container body 1 is restored to its original shape.

By forcibly admixing a foamable seasoning composition liquor with gas as described above, a fine dense foamed seasoning which substantially comprises only foam can be obtained.

Figure 2B:
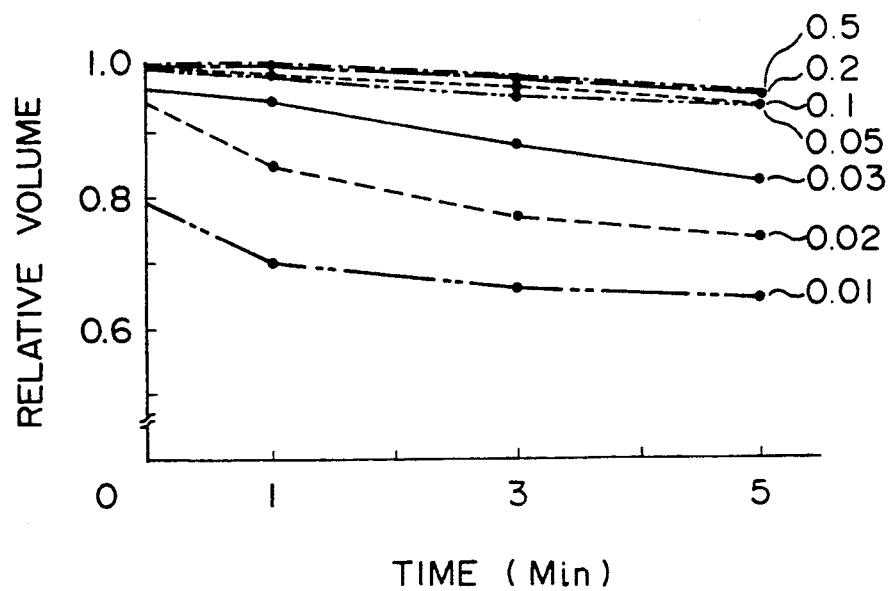
FIG. 2B shows relative volume with time of foamed soups for noodle with addition of emulsifier and ethanol.

FIG. 2A shows relative volume with time of foamed soups for noodle without any emulsifier and FIG. 2B shows relative volume with time of foamed soups for noodle with addition of emulsifier and ethanol.

Figure 3:
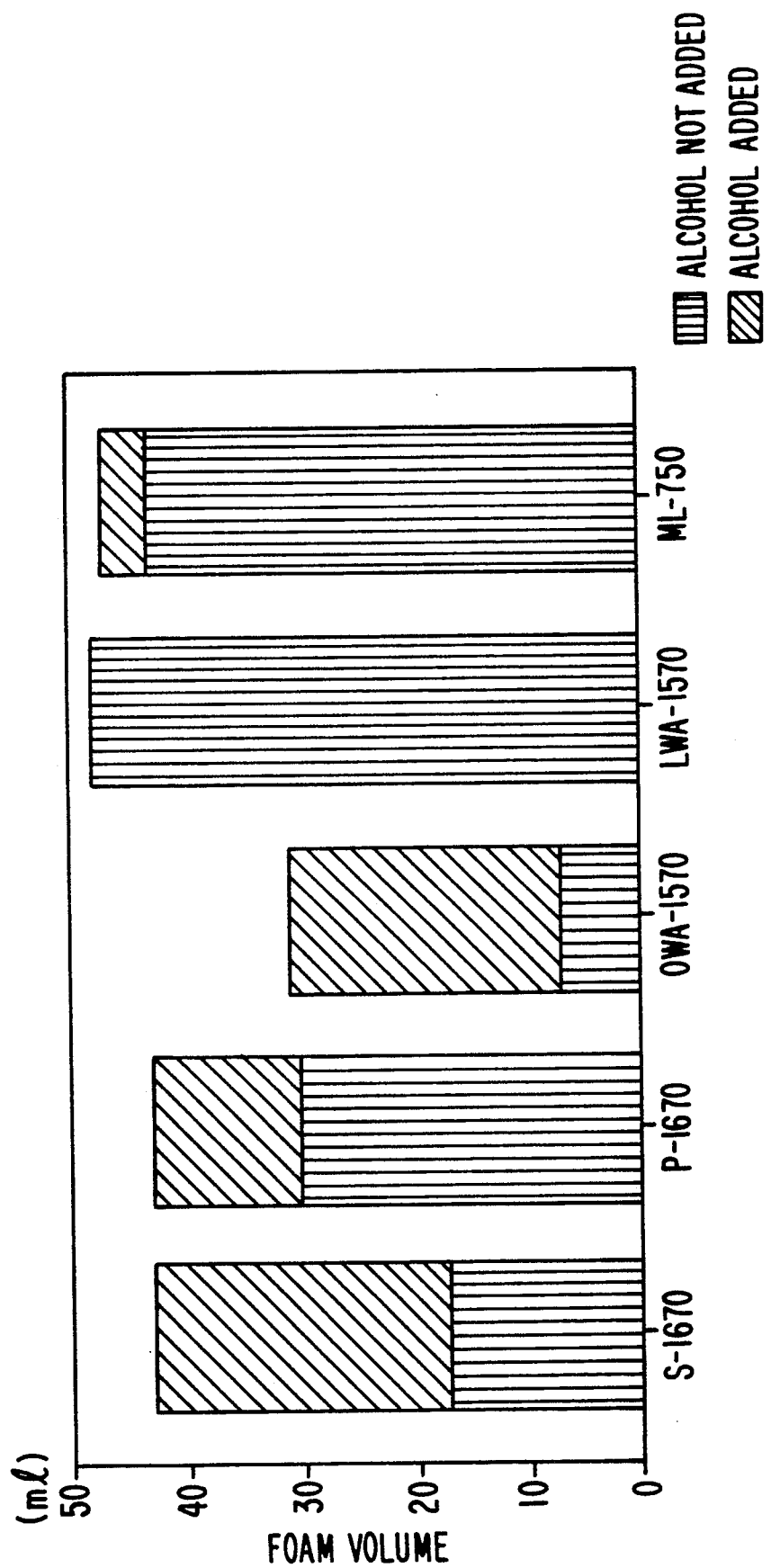
FIG. 3 shows foam volumes of soup for noodles after 5 minutes with addition of emulsifier and emulsifier/ethanol.

FIG. 3 shows foam volumes of soup for noodles after 5 minutes with addition of emulsifier and emulsifier/ethanol.

Figure 4A:
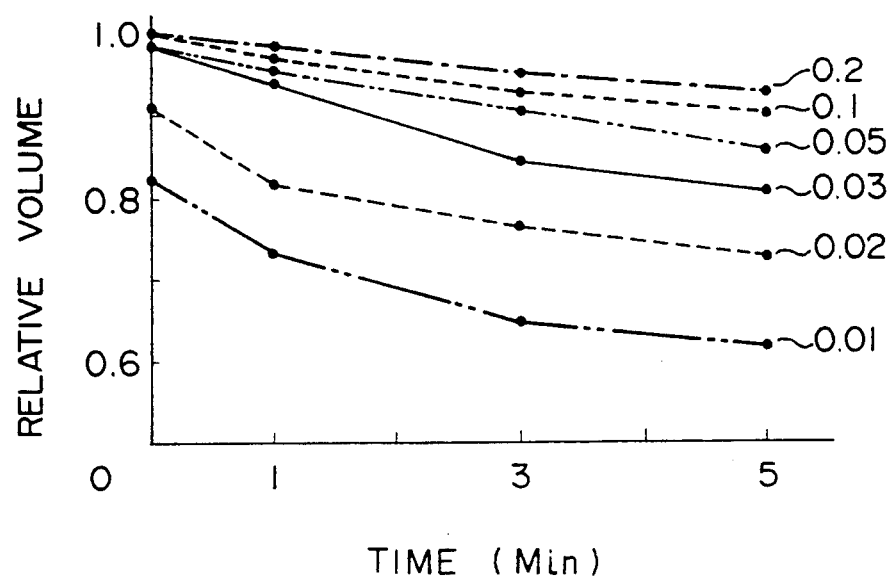
FIG. 4A shows relative volume with time of foamed soy sauce with addition of only emulsifier.
Figure 4B:
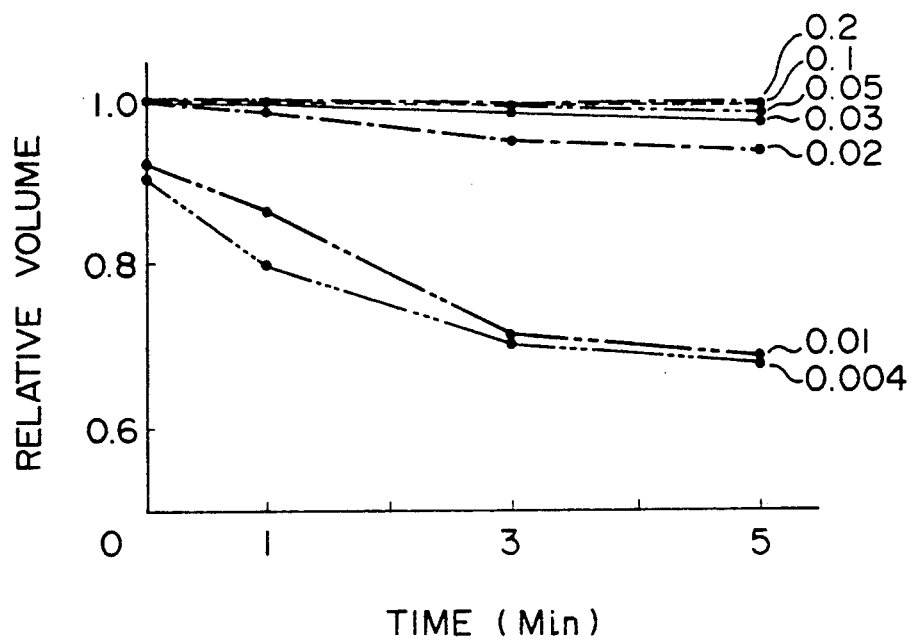
FIG. 4B shows relative volume with time of soy sauce with addition of emulsifier and ethanol.

FIG. 4A shows relative volume with time of foamed soy sauce with addition of only emulsifier and FIG. 4B shows relative volume with time of soy sauce with addition of emulsifier and ethanol.

Figure 5:
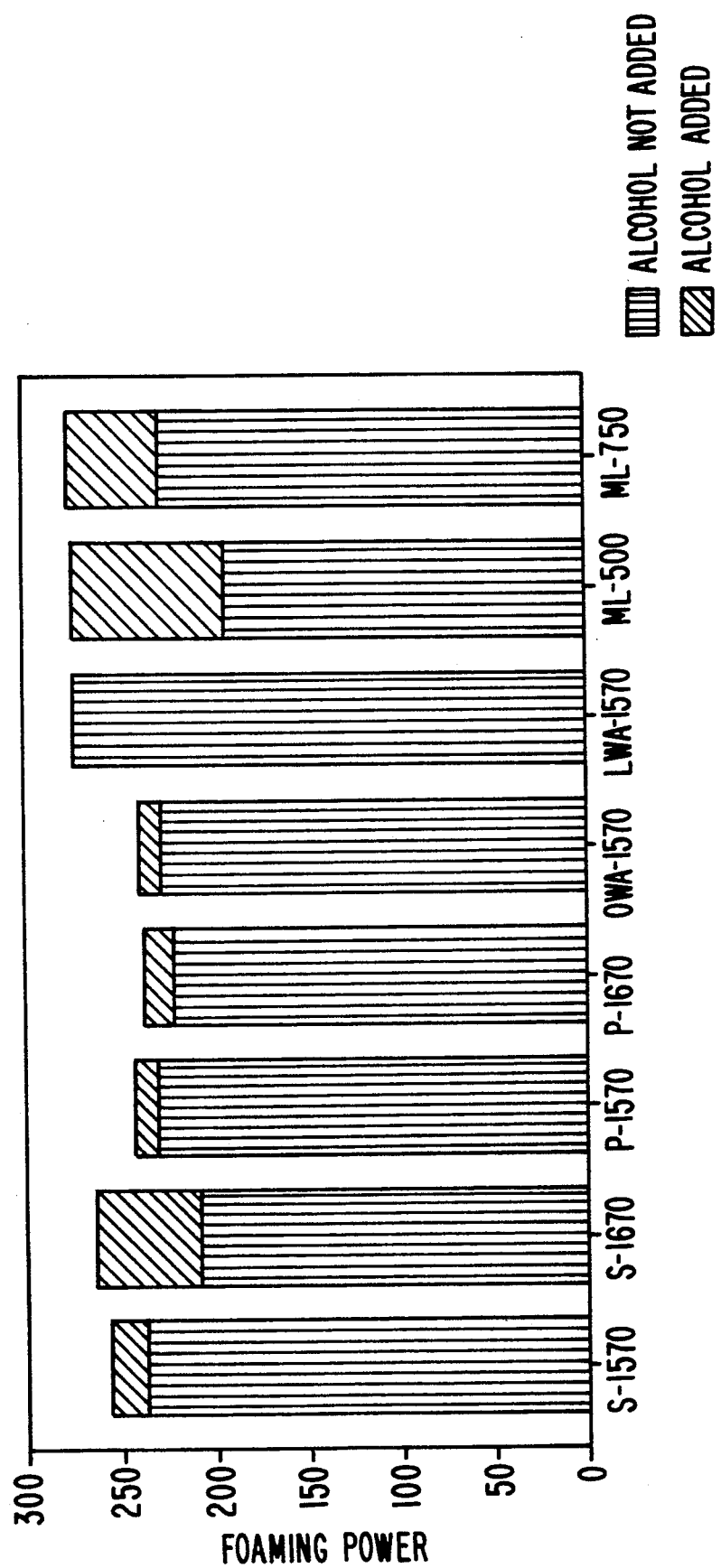
FIG. 5 shows foaming power of foamed soy sauce with addition of emulsifier and ethanol.
Figure 6A:
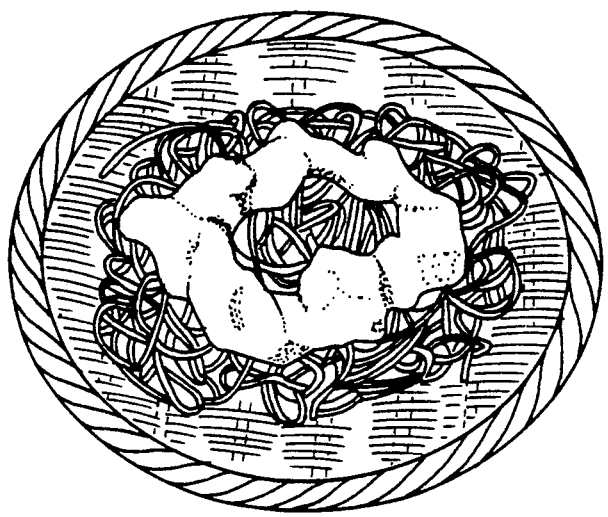
FIGS. 6A-6D and 7A-7D show applications of the present foamed seasoning to various foods.
Figure 6B:
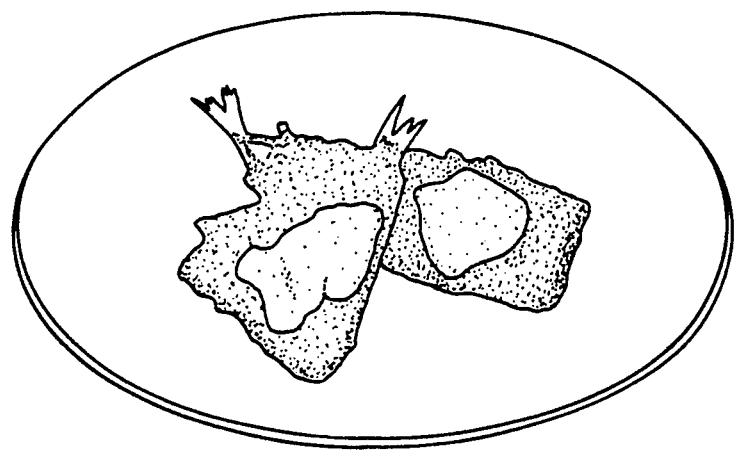
Figure 6C:
Figure 6D:
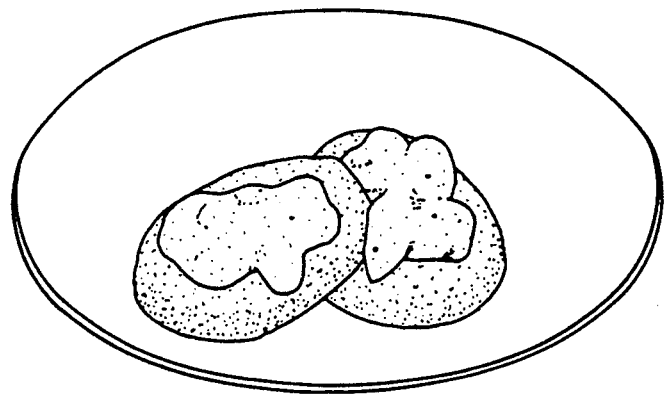
Figure 7A:
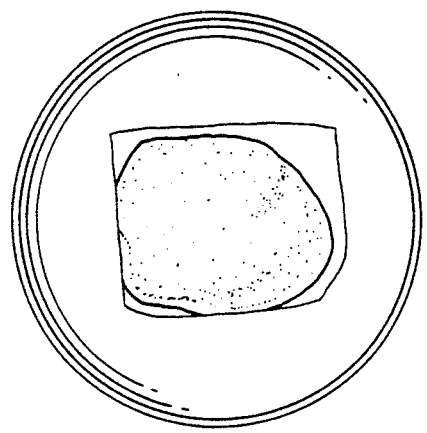
Figure 7B:
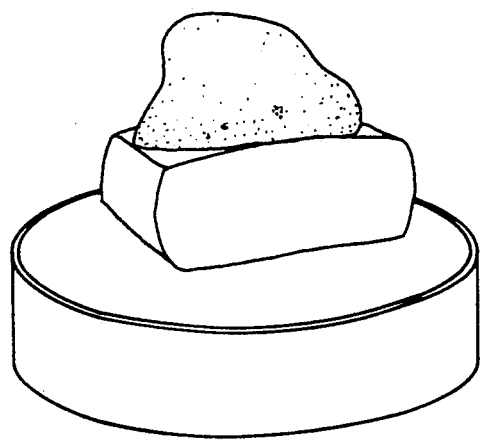
Figure 7C:
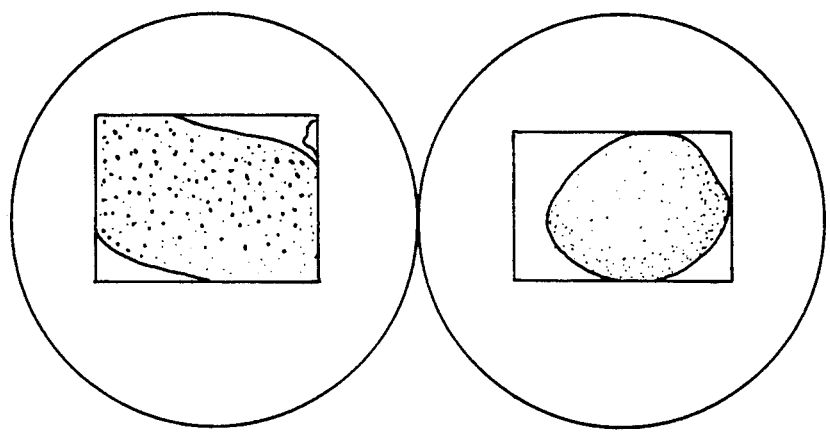
Figure 7D:
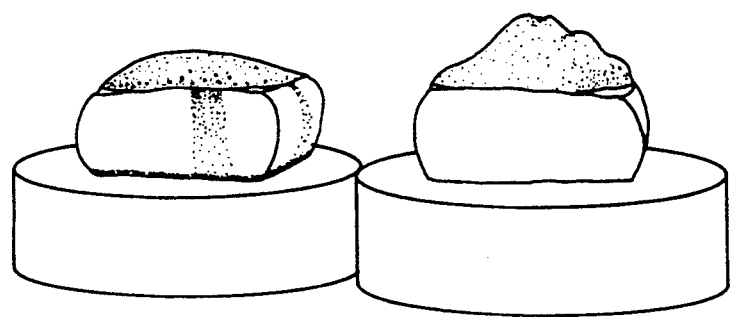

FIG. 5 shows foaming power of foamed soy sauce with addition of various emulsifiers and emulsifier/ethanol.

FIGS. 6 and 7 show an application of the present foamed seasoning to various foods. In FIG. 6, the photo of FIG. 6A shows an application of foamed soup to noodles, the photo of FIG. 6B shows an application of foamed PONZU-SHOYU to fried fish, the photo of FIG. 6C shows an application of foamed non-oil dressing to vegetable and the photo of FIG. 6D shows an application of foamed Worcester sauce to a croquette. In FIG. 7, the photo of FIG. 7A shows an overhead plan view of foamed seasoning-applied to Tofu, the photo of FIG. 7B shows a profile thereof, the photo of FIG. 7C shows an overhead view of Tofu on which foamed soy sauces with addition of emulsifier only and emulsifier/ethanol and the photo of FIG. 7D shows a profile thereof.

It is possible for the foamed seasoning of the present invention to adhere to and be maintained at only the desired site of an aimed dish or food components. Further, the foamed seasoning of the present invention has a lower absorption rate as compared with the original aqueous seasoning, so that it rarely gives an excessive flavor or deteriorates the texture by softening the texture of them. For example, in a raw vegetable salad made by dressing raw leaf vegetables having a crisp feeling to the teeth such as lettuce, celery or the like with a non-oil dressing or the like, the raw vegetables at the bottom of a container had the risk of rapidly softening the tissue due to the penetration of the dressing staying at the bottom and deteriorating the texture. In a salad of raw vegetables made with use of the foamed seasoning (foamed non-oil dressing) of the present invention has no such disadvantages.

Furthermore, when the foamed seasoning (e.g., foamed sauce) of the present invention is used in the process for preparing a food which is cooked by heating food materials in noodles form on a heated container such as in the case of fried noodles, it is possible to taste homogeneously the noodles. The foamed seasoning does not stay at the bottom of a container, or even if it stays at the bottom of the container, it penetrates only slowly into the noodles, so that it is possible to prevent the noodles from absorbing an excessive amount of a seasoning to deteriorate the taste, softening the texture or scorching them.

In the preparation of a food requiring delicate differences of flavors, it is difficult to give taste according to preference in the case of using an aqueous seasoning. However, when the foamed seasoning of the present invention is used, seasoning of a delicate flavor can be easily conducted.

Furthermore, quite new types of seasonings which are capable of giving a variety of flavors by preference, for example a seasoning in a form which can be used as a topping agent for a cooking, can be made from aqueous seasonings which have conventionally used as the seasonings for dips.

The present invention is explained below with reference to examples.

EXAMPLE 1

To a commercially available soup stock for noodles (manufactured by KIKKOMAN Co.) was added 3% of an alcohol followed by a sucrose fatty acid ester of a powder form ("RYOTO SUGAR ESTER S-1670, MITSUBISHI KASEI SHOKUHIN K.K., HLB=16) so that it had a predetermined concentration (%) as shown in FIG. 2A in order to give a foamable soup for noodles.

EXAMPLE 2

The foamable soup for noodles obtained in Example 1 above was compulsively admixed vigorously with air at 10,000 rpm for 60 min by means of a homogenizer to give a variety of foamed soups for noodles which showed relative volumes with the passage of time as shown in FIG. 2A.

EXAMPLE 3

To a commercially available soup stock for noodles (manufactured by KIKKOMAN Co.), 3% of an alcohol was added and an emulsifier in a liquid form which contained 40% of a sucrose fatty acid ester of a powder form ("RYOTO SUGAR ESTER LWA-1570, MITSUBISHI KASEI SHOKUHIN K.K., HLB=15) was further added to and dissolved in the mixture so that it had a predetermined concentration (%) as shown in FIG. 2B a order to give a foamable soup for noodles. The soup was forcibly admixed vigorously with air at 10,000 rpm for 60 min by means of a homogenizer to give a variety of foamed soups for noodles which showed relative volumes with a passage of time as shown in FIG. 2B. In this connection, the added amounts shown in FIG. 2B represent the values calculated in terms of the sucrose fatty acid ester powder.

The relative volumes shown in FIGS. 2A and 2B are obtained from the following equation: The volumes in FIGS. 3-1 and 3-2 are obtained similarly.

$$\text{relative volume} = \frac{\text{volume of foam only}}{\text{total volume after foaming}}$$

From the results of Examples 2 and 3, it is found that a foamed soup for noodles substantially comprising only foam which has a high foamability and foam stability after foaming is obtained by adding an emulsifier to the soup for noodles, and that more extensive effects can be obtained on the concentration of the emulsifier in the range of 0.03% or more, particularly of 0.1–0.5% and a foamed soup for noodles which comprises only foam can be obtained.

EXAMPLE 4

To a commercially available soup stock for noodles (manufactured by KIKKOMAN Co.) was added 3% of an emulsifier so that it had a predetermined concentration (%) as shown in Table 1-1 in order to give a foamable soup for noodles. The soup was charged in a container as shown in FIG. 1 for generating and squeezing a foamed liquid, and the container was deformed by pressing with fingers to give a variety of foamed soups for noodles. The qualities of the foamed soups were tested. The results are shown in Table 1-1 as the results of bottle foaming tests.

These foamed soups for noodles were poured on the surface of Japanese noodles "SOBA" to test the foam stability (property which is resistant to liquefaction), taste and flavor (presence or absence of the deterioration of flavor due to the foaming agent), the appearance of the foam (fineness, homogeniety, volume of the foam), and adherence (property of resisting the flowing out of the Japanese noodles "SOBA"). The results shown in Table 1-1 were obtained.

Then, an emulsifier shown in Table 1-2 below and ethyl alcohol are added to and dissolved in a soup stock for noodles so that they have predetermined concentrations in order to prepare foamable soups for noodles. Bottle foaming tests were conducted in the same manner as described above to evaluate the soups on using the Japanese noodles "SOBA". The results are shown in Table 1-2.

From the results shown in Tables 1-1 and 1-2, it has been found that foamability is extensively improved on adding the combination of the emulsifier and ethyl alcohol as compared with the case of adding only the emulsifier. It is also found that not only the foam stability is improved after foaming of the soup, but also the appearance and adherence of the foam are improved.

TABLE 1-1

| Example of foamed soups for noodles and the evaluation of it upon application to Japanese noodle | | | | | | | | |
|---|---|---|---|---|---|---|---|---|
| Item Division | 1 | 2 | 3 | 4 | 5 | 6 | 7 | 8 |
| Soup stock for noodles | 99.8 | 99.8 | 99.8 | 99.8 | 99.5 | 99.5 | 99.5 | 99.5 |
| Emulsifier RYOTO SUGAR ESTER: | | | | | | | | |
| S-1570 (Note 1) | 0.2 | | | | | | | |
| S-1670 | | 0.2 | | | | | | |
| P-1570 | | | 0.2 | | | | | |
| P-1670 | | | | 0.2 | | | | |
| OWA-1570 | | | | | 0.5 (Note 3) | | | |
| LWA-1570 | | | | | | | 0.5 (Note 3) | |
| SY-GLYSTAR (Note 2) | | | | | | | | |

TABLE 1-1-continued

Example of foamed soups for noodles and the evaluation of it upon application to Japanese noodle

| Item Division | 1 | 2 | 3 | 4 | 5 | 6 | 7 | 8 |
|---|---|---|---|---|---|---|---|---|
| ML-500 | | | | | | | 0.5 | |
| ML-750 | | | | | | | | 0.5 |
| Bottle foaming test | Δ | Δ | Δ | Δ | Δ | ⊚ | Δ | Δ |
| Evaluation | | | | | | | | |
| Foam stability | Δ | Δ | Δ | Δ | Δ | ⊚ | Δ | Δ |
| Taste | ⊚ | ⊚ | ⊚ | ⊚ | ⊚ | ⊚ | ○ | ○ |
| Flavor | ⊚ | ⊚ | ⊚ | ⊚ | ⊚ | ⊚ | ○ | ○ |
| Appearance of foam | Δ | Δ | Δ | Δ | Δ | ⊚ | Δ | Δ |
| Adherence | Δ | Δ | Δ | Δ | Δ | ⊚ | Δ | Δ |

Note 1: A sucrose fatty acid ester (MITSUBISHI KASEI SHOKUHIN K.K.).
Note 2: Polyglycerin fatty acid ester (SAKAMOTO YAKUHIN KOGYO K.K.).
Note 3: Calculated in terms of powder, 0.2%.
⊚: very good; ○: good; Δ: slightly bad; X: bad.

TABLE 1-2

Example of foamed soups for noodles and the evaluation of it upon application to Japanese noodle (ethanol added)

| Item Division | 1 | 2 | 3 | 4 | 5 | 6 | 7 | 8 |
|---|---|---|---|---|---|---|---|---|
| Soup stock for noodles | 94.8 | 94.8 | 92.8 | 92.8 | 92.5 | 96.5 | 92.5 | 92.5 |
| Emulsifier RYOTO SUGAR ESTER: | | | | | | | | |
| S-1570 (Note 1) | 0.2 | | | | | | | |
| S-1670 | | 0.2 | | | | | | |
| P-1570 | | | 0.2 | | | | | |
| P-1670 | | | | 0.2 | | | | |
| OWA-1570 | | | | | 0.5 | | | |
| LWA-1570 | | | | | | 0.5 | | |
| SY-GLYSTAR (Note 2) | | | | | | | | |
| ML-500 | | | | | | | 0.5 | |
| ML-750 | | | | | | | | 0.5 |
| Ethanol | 5.0 | 5.0 | 7.0 | 7.0 | 7.0 | 3.0 | 7.0 | 7.0 |
| Bottle foaming test | ⊚ | ⊚ | ⊚ | ⊚ | ○ | ⊚ | ⊚ | ⊚ |
| Evaluation | | | | | | | | |
| Foam stability | ⊚ | ⊚ | ⊚ | ⊚ | ○ | ⊚ | ⊚ | ⊚ |
| Taste | ⊚ | ⊚ | ⊚ | ⊚ | ○ | ⊚ | ○ | ○ |
| Flavor | ⊚ | ⊚ | ⊚ | ⊚ | ○ | ⊚ | ○ | ○ |
| Appearance of foam | ⊚ | ⊚ | ⊚ | ⊚ | Δ | ⊚ | ⊚ | ⊚ |
| Adherence | ⊚ | ⊚ | ⊚ | ⊚ | Δ | ⊚ | ⊚ | ⊚ |

EXAMPLE 5

A 15 ml portion of foamable soup stock for noodles to which commercially available emulsifiers S-1670, P-1670, OWA-1570, LWA-1570 and ML-750 were added in the amounts of 0.2%, 0.2%, 0.5% (0.2% calculated in terms of powder), 0.5% (the same as the left) and 0.2%, respectively was forcibly compulsively admixed with air at 10,000 rpm for 60 minutes by means of a homogenizer to give a variety of foamed soups for noodles.

When the volume of only the foam was measured after standing for 5 minutes, the results as shown in FIG. 3 were obtained.

When 5% of ethyl alcohol was then added to the foamable soups for noodles obtained above and the mixture was treated in the same manner as above, the results as shown in FIG. 3 were obtained.

As apparent from FIG. 3, variation was observed in foamability of the foamable soups for noodles thus obtained depending on the emulsifiers when only an emulsifier was used in the soup stock for noodles.

However, when a combination of an emulsifier and ethyl alcohol is used in the soup stock for noodles, it is found that the effect of adding ethyl alcohol is extensively exhibited in items of poor foamability.

EXAMPLE 6

To a variety of aqueous seasonings shown in the following Table 2, predetermined amounts of a sucrose fatty acid ester of a powder form ("RYOTO SUGAR ESTER LWA-1570, MITSUBISHI KASEI SHOKUHIN K.K.) and ethyl alcohol were added and the mixture was dissolved to give foamable seasoning composition liquors. The liquor was charged in a container for generating and squeezing a foamed liquid, and bottle foaming tests in which a variety of foamed seasonings were prepared were conducted by deforming the container by pressing with fingers.

Next, the foam stability and the taste, flavor, appearance and adherence of foam were tested for a variety of foamed seasonings thus obtained. The results are shown in Table 2.

It is found from the results of Table 2 that a variety of foamed seasonings can be obtained very easily according to the present invention.

TABLE 2

| Item Division | Bottle foaming test of a variety of aqueous seasonings | | | | | | |
|---|---|---|---|---|---|---|---|
| | 1 | 2 | 3 | 4 | 5 | 6 | 7 |
| Aqueous seasonings | PONZU-SHOYU | Liquid bonito stock | Soy sauce for stock | Non-oil dressing | Worcestershire sauce | Sauce for steak | MIRIN-like seasoning |
| Content of aqueous seasoning (W/W) | 96.8 | 96.8 | 96.8 | 96.8 | 94.5 | 94.5 | 94.5 |
| RYOTO SUGAR ESTER LAW-1570 (W/W) | 0.2 | 0.2 | 0.2 | 0.2 | (Note 1) 0.5 | (Note 1) 0.5 | (Note 1) 0.5 |
| Ethanol (W/W) | 3.0 | 3.0 | 3.0 | 3.0 | 5.0 | 5.0 | 5.0 |
| Bottle foaming test | ⊚ | ⊚ | ⊚ | ⊚ | ⊚ | ⊚ | ⊚ |
| Evalution | | | | | | | |
| Foam stability | ⊚ | ⊚ | ⊚ | ⊚ | ⊚ | ⊚ | ⊚ |
| Taste | ⊚ | ○ | ⊚ | ⊚ | ⊚ | ⊚ | ⊚ |
| Flavor | ⊚ | ○ | ⊚ | ⊚ | ⊚ | ⊚ | ⊚ |
| Appearance of foam | ⊚ | ⊚ | ⊚ | ⊚ | ⊚ | ⊚ | ⊚ |
| Adherence | ⊚ | ⊚ | ⊚ | ⊚ | ⊚ | ⊚ | ⊚ |

Note 1: calculated as powder 0.2% (W/W)
⊚: very good. ○: good, △: slightly bad, X: bad.

APPLICATION EXAMPLE 1

The foamable Worcestershire sauce obtained in Example 6 above was charged in a foamed liquid squeezing container as shown in FIG. 1 so that the foamed Worcestershire sauce can be easily prepared by deforming the barrel part of the container by pressing with fingers.

Next, a 150 g portion of boiled noodles for making fried noodles was placed on a frying pan, and the fried noodles were prepared in a usual manner with pouring the aforementioned foamed, Worcestershire sauce thereon. The result was examined by comparing with that of using a conventional Worcestershire sauce.

The results are shown in Table 3.

TABLE 3

| Division | | Amount | Organoleptic test | | Characteristic |
|---|---|---|---|---|---|
| Item | Characteristic | added | Flavor | Texture | on cooking |
| Present invention | Foamed Worcestershire sauce | 40 g | good | appropriate | hardly scorched |
| Control | Liquid Worcestershire sauce | 35 g | good | soft | easily scorched |

It is found from Table 3 that noodles are soft and tend to be scorched easily and a delicate flavoring of the noodles is difficult with a conventional Worcestershire sauce, but the noodles have an appropriate texture and are hardly scorched notwithstanding the use of the foamed Worcestershire sauce of the present invention in an excessive amount by 5 g as compared with the case of using the conventional Worcestershire sauce and a declicate flavoring can be given to the noodle.

EXAMPLE 7

To a common soy sauce was added a predetermined amount (weight %) of a sucrose fatty acid ester in powder form ("RYOTO SUGAR ESTER S-1670, MITSUBISHI KASEI SHOKUHIN K.K., HLB=16), as shown in FIG. 4A to obtain foamable soy sauce composition liquor.

EXAMPLE 8

The foamable soy sauce composition liquor obtained in Example 7 was compulsively admixed vigorously with air at 10,000 rpm for 60 seconds by means of a homogenizer to give a variety of foamed soy sauce which showed relative volumes with time as shown in FIG. 4A.

EXAMPLE 9

To a common heated soy sauce was added a predetermined amount (weight %) of a sucrose fatty acid ester in a powder form ("RHOTO SUGAR ESTER LWA-1570, MITSUBISHI KASEI SHOKUHIN K.K., HLB=15) as shown in FIG. 4B to obtain foamable soy sauce composition liquor. This liquor was compulsively admixed vigorously with air at 10,000 rpm for 60 seconds by means of a homogenizer to give a variety of foamed soy sauces which showed relative volumes with time as shown in FIG. 4B. Each addition amount as shown in FIG. 4B is a value calculated as sucrose fatty acid ester powder.

From the results of Examples 2, 3, 8 and 9, it is found that a foamed seasoning substantially comprising only foam which has a high foamability and foam stability after foamable is obtained by adding an emulsifier to the seasoning, and that more extensive effects can be obtained on the concentration of the emulsifier in the range of 0.03% or more, particularly of 0.1-0.5% and a foamed seasoning which comprises only foam can be obtained.

EXAMPLE 10

To a common soy sauce was added an emulsifier so that it had a predetermined concentration as shown in Table 4-1 in order to give a foamable soy sauce composition. The composition was charged in a container for generating and squeezing a foamed liquid, and the container was deformed by pressing with fingers to give a variety of foamed soy sauce. The qualities of the foamed soy sauces were tested. The results are shown in Table 4-1 as the results of bottle foaming tests.

These foamed soy sauces were poured on "TOFU" been curd to test the foam stability (property which is resistant to liquefaction), taste and flavor (presence or absence of the deterioration of flavor due to the foaming agent), the appearance of the foam (fineness, homogeniety, volume of the foam), and adherence (property of resisting the flowing off of the bean curd). The results shown in Table 4-1 were obtained.

Then, an emulsifier shown in Table 4-2 below and ethyl alcohol were added to and dissolved in a common heated soy sauce so that they have predetermined concentrations in order to prepare foamable soy sauce composition liquors. Bottle foaming tests were conducted in the same manner as described above to evaluate the compositions on using the bean curd "TOFU". The results are shown in Table 4-2.

From the results shown in Tables 4-1 and 4-2, it is found that foamability is extensively improved by adding to the soy sauce the combination of the emulsifier and ethyl alcohol as compared with the case of adding only the emulsifier. It is also found that not only the foam stability is improved after foaming of the liquor, but also the appearance and adherence of the foam are improved.

TABLE 4-1

Example of foamed soy sauce composition liquors and the evaluation of them upon application to "TOFU"

| Item Division | 1 | 2 | 3 | 4 | 5 | 6 | 7 | 8 |
|---|---|---|---|---|---|---|---|---|
| Soy sauce | 99.8 | 99.8 | 99.8 | 99.8 | 99.5 | 99.5 | 99.7 | 99.7 |
| Emulsifier RYOTO SUGAR ESTER: | | | | | | | | |
| S-1570 (Note 1) | 0.2 | | | | | | | |
| S-1670 | | 0.2 | | | | | | |
| P-1570 | | | 0.2 | | | | | |
| P-1670 | | | | 0.2 | | | | |
| OWA-1570 | | | | | 0.5 | | | |
| LWA-1570 | | | | | | 0.5 | | |
| SY-GLYSTAR (Note 2) | | | | | | | | |
| ML-500 | | | | | | | 0.3 | |
| ML-750 | | | | | | | | 0.3 |
| Bottle foaming test | ○ | ○ | ○ | ○ | ○ | ⊙ | Δ | X |
| Evaluation | | | | | | | | |
| Foam stability | X | X | X | X | ○ | ⊙ | X | X |
| Taste | ⊙ | ⊙ | ⊙ | ⊙ | ⊙ | ⊙ | ⊙ | ⊙ |
| Flavor | ⊙ | ⊙ | ⊙ | ⊙ | ⊙ | ⊙ | ⊙ | ⊙ |
| Appearance of foam | X | X | X | X | X | ⊙ | X | X |
| Adherence | Δ | Δ | Δ | Δ | ○ | ⊙ | X | Δ |

Note 1: A sucrose fatty acid ester (MITSUBISHI KASEI SHOKUHIN K.K.)
Note 2: Polyglycerin fatty acid ester (SAKAMOTO YAKUHIN KOGYO K.K.).
⊙: very good; ○: good; Δ: slightly bad; X: bad.

TABLE 4-2

Example of foamed soy sauce composition liquors and the evaluation of them upon application to "TOFU" (ethanol added)

| Item Division | 1 | 2 | 3 | 4 | 5 | 6 | 7 | 8 |
|---|---|---|---|---|---|---|---|---|
| Soy sauce | 96.8 | 96.8 | 96.8 | 96.8 | 96.5 | 96.5 | 96.7 | 96.7 |
| Emulsifier RYOTO SUGAR ESTER: | | | | | | | | |
| S-1570 (Note 1) | 0.2 | | | | | | | |
| S-1670 | | 0.2 | | | | | | |
| P-1570 | | | 0.2 | | | | | |
| P-1670 | | | | 0.2 | | | | |
| OWA-1570 | | | | | 0.5 | | | |
| LWA-1570 | | | | | | 0.5 | | |
| SY-GLYSTAR (Note 2) | | | | | | | | |
| ML-500 | | | | | | | 0.3 | |
| ML-750 | | | | | | | | 0.3 |
| Ethanol | 3.0 | 3.0 | 3.0 | 3.0 | 3.0 | 3.0 | 3.0 | 3.0 |
| Bottle foaming test | ⊙ | ⊙ | ⊙ | ⊙ | ⊙ | ⊙ | ⊙ | ⊙ |
| Evaluation | | | | | | | | |
| Foam stability | ⊙ | ⊙ | ⊙ | ⊙ | ⊙ | ⊙ | ⊙ | ⊙ |
| Taste | ⊙ | ⊙ | ⊙ | ⊙ | ⊙ | ⊙ | ⊙ | ⊙ |
| Flavor | ⊙ | ⊙ | ⊙ | ⊙ | ⊙ | ⊙ | ⊙ | ⊙ |
| Appearance of foam | ⊙ | ⊙ | ⊙ | ⊙ | ⊙ | ⊙ | ⊙ | ⊙ |
| Adherence | ⊙ | ⊙ | ⊙ | ⊙ | ⊙ | ⊙ | ⊙ | ⊙ |

EXAMPLE 11

A variety of emulsifiers as shown in FIG. 5 were added to the common soy sauce in the amounts as described in Table 4-1 to give foamable soy sauce composition liquors. The liquors were forcibly blended with air at 10,000 rpm for 60 minutes with a homogenizer to give a variety of foamed soy sauces.

When the volumes of vapor phase and liquid phase in the foam were measured after standing for 5 minutes and the foamabilities were calculated from the following equations, the results as shown in FIG. 5 were obtained. Foamability is usually defined as "Foaming power".

$$\text{Volume of vapor phase} = \text{Volume of foam} - \text{Volume of liquid phase}$$

$$\text{Volume of liquid phase} = \frac{\text{Weight of foam}}{\text{Specific gravity of a foamable soy sauce composition liquor}}$$

$$\text{Foaming power} = \frac{\text{Volume of vapor phase}}{\text{Volume of liquid phase contained in foam}}$$

In order to examine the effect of ethyl alcohol, the emulsifiers as described in Table 4-2 were added to the common soy sauce and 3% by weight of ethyl alcohol was then added to the soy sauce. The mixture was treated in the same manner as above to give a variety of foamable soy sauce composition liquors, and the "Foaming power" of them were examined. The results are shown in FIG. 5.

As apparent from FIG. 5, variation was observed in foamability of the foamable soy sauce composition liquors thus obtained depending on the emulsifiers when only an emulsifier was used in the soy sauce.

However, when a combination of an emulsifier and ethyl alcohol is used in the soy sauce, it is found that the effect of adding ethyl alcohol is extensively exhibited in the aforementioned divisions of poor foamability. It is also found that the foamability increases to a extent of 5—ca. 40%.

EXAMPLE 12

To a variety of soy sauces shown in the following Table 5, 0.5% by weight of a sucrose fatty acid ester ("RYOTO SUGAR ESTER LWA-1570, MITSUBISHI KASEI SHOKUHIN K.K.) was added to give foamable seasoning composition liquors. The liquor was charged in a container for generating and squeezing a foamed liquid, and the bottle was deformed by pressing with fingers in order to give a variety of foamed soy sauces.

Next, the fineness, the presence or absence of homogeniety and the volume of foam were examined for a variety of foamed soy sauces thus obtained. The results are shown in Table 5.

It is found from the results of Table 5 that a variety of foamed soy sauces can be obtained very easily according to the present invention.

TABLE 5

Bottle foaming test depending on the types of soy sauces

| Soy sauce | Fineness | Homogeniety | Volume of foam | Total |
|---|---|---|---|---|
| Koikuchi (Common) | ⊚ | ⊚ | ⊚ | ⊚ |
| Usukuchi (Light color) | ⊚ | ⊚ | ⊚ | ⊚ |
| Tamari | ○ | ○ | ⊚ | ○ |
| Shinshiki (Semifermented) | ⊚ | ⊚ | ⊚ | ⊚ |
| Shiro (Extra light color) | ⊚ | ⊚ | ⊚ | ⊚ |
| Saishikomi (Refermented) | ⊚ | ⊚ | ⊚ | ⊚ |
| Kiage (Raw soy sauce) | ⊚ | ⊚ | ⊚ | ⊚ |
| Reduced saline content (NaCl, 8.5%) | ⊚ | ⊚ | ⊚ | ⊚ |
| Amino acid blended | ⊚ | ⊚ | ⊚ | ⊚ |

⊚: very good; ○: good; Δ: slightly bad; X: bad

What is claimed is:

1. A foamable seasoning composition comprising a nonfat aqueous seasoning selected from the group consisting of sauces, non-oil dressings, and liquid stocks, emulsifier, and 3-10 weight % of ethanol to enhance foam formation of said composition.

2. The composition of claim 1 wherein the emulsifier is hydrophilic.

3. The composition of claim 1 wherein the emulsifier has a hydrophilic lipophilic balance (HLB) of greater than 13.

4. The composition of claim 1 wherein said emulsifier is selected from the group consisting of a fatty acid ester of sugar and a fatty acid of glycerine.

5. The composition of claim 1 wherein the amount of emulsifier is greater than about 0.03% by weight of the amount of said seasoning.

6. The composition of claim 5 wherein the amount of said emulsifier is between about 0.1% and 0.5% by weight of the amount of said aqueous seasoning.

7. The composition of claim 1 wherein the sauce comprises soy sauce.

8. The composition of claim 1 wherein the amount of ethanol is between about 3% and about 7% of the composition by weight.

9. The composition of claim 1 wherein the liquid stock comprises soup stock.

10. The composition of claim 1 wherein the sauce comprises a blend of soy sauce, vinegar and citrus juice.

11. A process for preparing a foamed nonfat seasoning which comprises:
adding an emulsifier and 3-10 weight % ethanol to a nonfat aqueous seasoning selected from the group consisting of sauces, non-oil dressings, and liquid stocks to obtain a foamable seasoning and to enhance the foam formation of said foamable seasoning; and
forcing a gas through said foamable seasoning to form a foamed seasoning.

12. The process of claim 11 wherein the step of adding is performed at a temperature equal to or greater than the melting point of said emulsifier.

* * * * *